Ｕ S009294532B2

（12）United States Patent
Lindsay

(10) Patent No.: US 9,294,532 B2
(45) Date of Patent: Mar. 22, 2016

(54) PERFORMING AN ACTION ON A SOCIAL NETWORKING SYSTEM BASED ON A CONTENT IDENTIFIER EMBEDDED IN PROVIDED CONTENT

(71) Applicant: Facebook, Inc., Menlo Park, CA (US)

(72) Inventor: Robert Taaffe Lindsay, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 359 days.

(21) Appl. No.: 13/933,585

(22) Filed: Jul. 2, 2013

(65) Prior Publication Data

US 2015/0012592 A1 Jan. 8, 2015

(51) Int. Cl.
G06F 15/16 (2006.01)
H04L 29/06 (2006.01)
G06F 17/30 (2006.01)
H04N 21/235 (2011.01)
G06Q 50/00 (2012.01)

(52) U.S. Cl.
CPC ........ *H04L 65/602* (2013.01); *G06F 17/30997* (2013.01); *G06Q 50/01* (2013.01); *H04N 21/2353* (2013.01)

(58) Field of Classification Search
CPC .............. H04L 12/588; H04L 65/601–65/604; H04L 67/2804; G06F 17/301–17/3012; G06F 17/30997; G06Q 17/30997; H04N 21/235–21/2355
See application file for complete search history.

(56) References Cited

U.S. PATENT DOCUMENTS

| | | | |
|---|---|---|---|
| 6,505,169 B1 * | 1/2003 | Bhagavath | G06Q 30/02 705/14.66 |
| 8,250,145 B2 | 8/2012 | Zuckerberg et al. | |
| 2004/0187151 A1 * | 9/2004 | Dunstan | G11B 27/034 725/55 |
| 2008/0027983 A1 * | 1/2008 | Erol | G06K 9/00221 |
| 2008/0195468 A1 * | 8/2008 | Malik | G06Q 30/02 705/14.53 |
| 2009/0113468 A1 * | 4/2009 | Steelberg | G06Q 30/02 725/32 |
| 2009/0129755 A1 * | 5/2009 | Rakib | G06F 17/30781 386/241 |
| 2009/0164419 A1 * | 6/2009 | Taylor | G06Q 30/02 |
| 2009/0249290 A1 * | 10/2009 | Jenkins | G06F 9/4443 717/109 |
| 2012/0166532 A1 | 6/2012 | Juan et al. | |
| 2013/0104024 A1 * | 4/2013 | Rajkumar | G06F 17/30781 715/234 |
| 2014/0250457 A1 * | 9/2014 | Ramaswamy | H04N 21/812 725/34 |

OTHER PUBLICATIONS

Hua, M., et al., "Updating Features Based on User Actions in Online Systems," U.S. Appl. No. 13/690,254, filed Nov. 30, 2012.
Kabiljo, I., et al., "Customized Predictors for User Actions in an Online System," U.S. Appl. No. 13/689,969, filed Nov. 30, 2012.
Shalita, A. M., et al., "Dynamic Expressions for Representing Features in an Online System," U.S. Appl. No. 13/690,088, filed Nov. 30, 2012.

* cited by examiner

*Primary Examiner* — Brendan Higa
(74) *Attorney, Agent, or Firm* — Fenwick & West LLP

(57) ABSTRACT

A content source provides metadata associated with content, such as an audio signal or video data, to a social networking system. The metadata identifies characteristics of the content or specifies an action for the social networking system to perform. A content identifier associated with the metadata is generated by the social networking system, and an association between the content identifier and the metadata is stored. The content identifier is provided to the content source, which encodes the content identifier into the content (e.g., as a watermark). When a client device receives the content encoded with the content identifier, the content identifier is extracted and communicated to the social networking system in connection with a user account associated with the client device. Based on the content identifier, the social networking system retrieves the corresponding metadata and performs an action in connection with the user account based on the metadata.

12 Claims, 2 Drawing Sheets

US 9,294,532 B2

PERFORMING AN ACTION ON A SOCIAL NETWORKING SYSTEM BASED ON A CONTENT IDENTIFIER EMBEDDED IN PROVIDED CONTENT

BACKGROUND

This invention relates generally to retrieving information associated with retrieved content, and more specifically to performing an action based on information embedded in content.

Real-time identification of audio signals is being increasingly used in various applications. For example, many systems use various audio signal identification schemes to identify the name, artist, and/or album of an unknown song. Currently, various audio signal identification schemes have been developed. In one class of schemes, an audio fingerprint is generated for an audio signal, where the audio fingerprint includes characteristic information about the audio signal usable for identifying the audio signal. The characteristic information about the audio signal may be based on acoustical and perceptual properties of the audio signal. To identify an audio signal, an audio fingerprint generated from the audio signal is compared to a database of reference audio fingerprints.

However, a content provider may wish to provide additional information to users receiving content. For example, the content provider may seek to provide information about the content provider or disseminate information about the content provider or content to other users. Conventional audio fingerprints merely allow a content provider to present information describing an audio signal or other content, and do not allow a content provider to supplement the identification information with other functionality.

SUMMARY

A content source associates metadata with content provided by the content source. For example, the metadata identifies an artist or creator of the content, a location associated with the content or content source, an identifier of the content source. The metadata may include information associated with one or more actions to be performed by a social networking system when a social networking system user receives the content via a client device. For example, the metadata identifies an action for the social networking system to perform and includes information for performing the action. Examples of actions identified by the metadata include executing an application identified by the metadata, storing data identified by the metadata, communicating data identified by the metadata to users of the social networking system, identifying an advertisement based on information in the metadata, and associating the user with a location identified by the metadata.

The content source provides the metadata associated with the content to the social networking system, which generates a content identifier uniquely identifying the metadata. An association between the metadata and the content identifier is stored by the social networking system, and the content identifier is communicated to the content source. The content source embeds the content identifier into its corresponding content (e.g., as a watermark) and provides the content to a client device. For example, the content source broadcasts an audio signal encoded with the content identifier.

When a client device associated with a user of the social networking system receives the content, the client device extracts the content identifier from the content. For example, an application associated with the social networking system and executing on the client device extracts the content identifier from the content. The extracted content identifier is communicated from the client device to the social networking system, which retrieves the metadata associated with the content identifier. If the metadata specifies an action, the social networking system performs the action specified by the metadata and communicates data describing or generated by the action to the client device or to additional social networking system users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
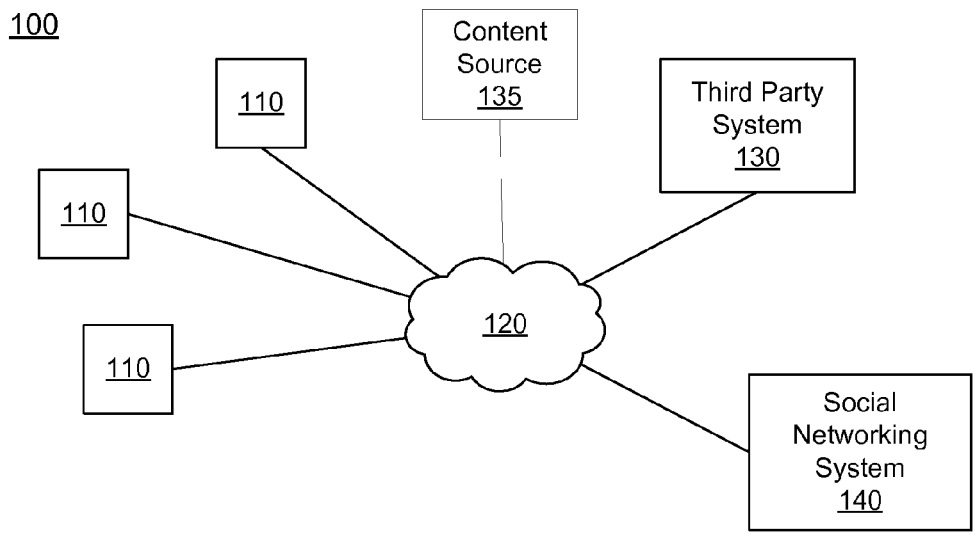
FIG. 1 is a block diagram of a system environment in which a social networking system operates, in accordance with an embodiment of the invention.

FIG. 1 is a block diagram of a system environment 100 for a social networking system 140. The system environment 100 shown by FIG. 1 comprises one or more client devices 110, a network 120, a content source 135, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

Additionally, a client device 110 may include one or more audio capture devices, such as one or more microphones, configured to capture audio data from an environment surrounding the client device 110. A client device 110 may also include one or more image capture devices. For example, the client device 110 includes a camera or video recording device. This allows a client device 110 to capture audio and/or video content from an environment surrounding the client device 110. For example, the client device 110 captures audio or video data provided by a content source 135 using an audio capture device or an image capture device, respectively. Further, the client device 110 includes one or more applications that extract information from received content. For example, an application associated with the social networking system 140 is executed by the client device 110 to extract a content identifier from content received by the client device 110 and to communicate the content identifier to the social networking system 140.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

The content source 135 provides content to a client device 110 using any suitable channel. For example, the content source 135 is any entity suitable for generating audio or a representation of audio, such as a speakers of a mobile device, speakers of a stereo or other device producing audio content, a desktop computer transmitting representing of a song, or other suitable entity generating audio. As another example, the content source 135 is any entity suitable for generating video or image data, such as a computer display, a television, a display device of a mobile device, an image, or any other suitable entity presenting video or image data.

As further described above in conjunction with FIG. 3, the content source 135 may specify metadata describing one or more characteristics of the content. For example, the metadata identifies an artist or creator of the content, a location associated with the content or content source 135, an identifier of the content source 135. Additionally, the metadata may include information associated with one or more actions performed by the social networking system 140. For example, the metadata identifies an action for the social networking system 140 to perform and includes information for performing the action. Examples of actions identified by the metadata include executing an application identified by the metadata, storing data identified by the metadata, communicating data identified by the metadata to users of the social networking system 140, identifying an advertisement based on information in the metadata, and associating the user with a location identified by the metadata. As described further in conjunction with FIG. 3, the content source 135 identifies the metadata to the social networking system 140 and receives a content identifier that the social networking system 140 uses to retrieve the metadata. The content source 135 embeds the content identifier into its corresponding content, allowing a client device 110 to extract the content identifier and communicate the content identifier to the social networking system 140, which provides the client device 110 with information based on the metadata associated with the content identifier.

Figure 2:
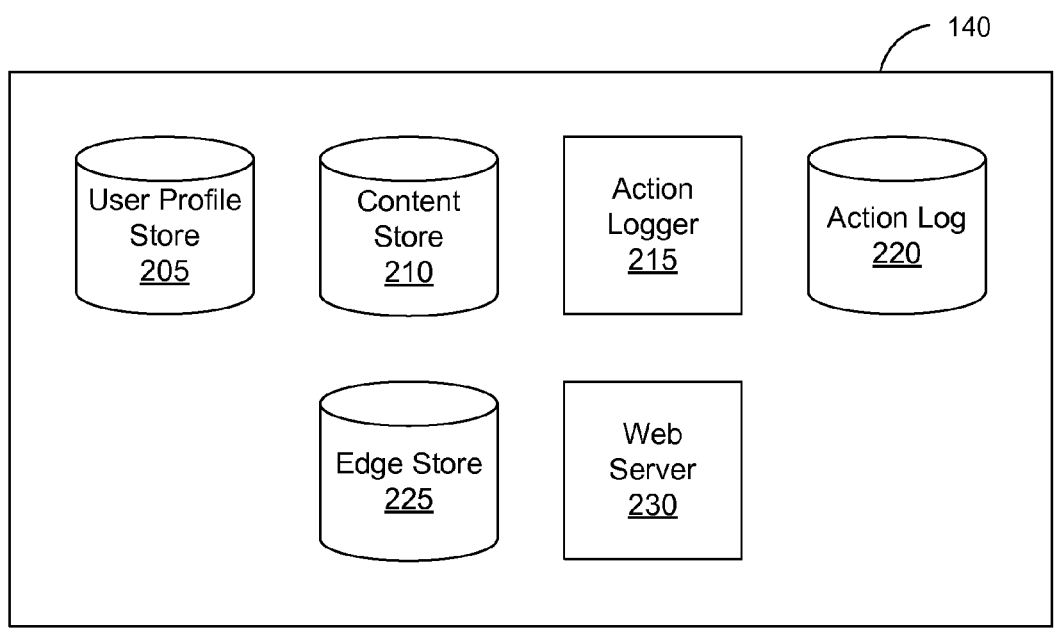
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, and a web server 230. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 230 links the social networking system 140 via the network 120 to the one or more client devices 110, as well as to the one or more third party systems 130. The web server 230 serves web pages, as well as other content, such as JAVA®, FLASH®, XML and so forth. The web server 230 may receive and route messages between the social networking system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS® or RIM®.

Performing an Action Based on Received Content

Figure 3:
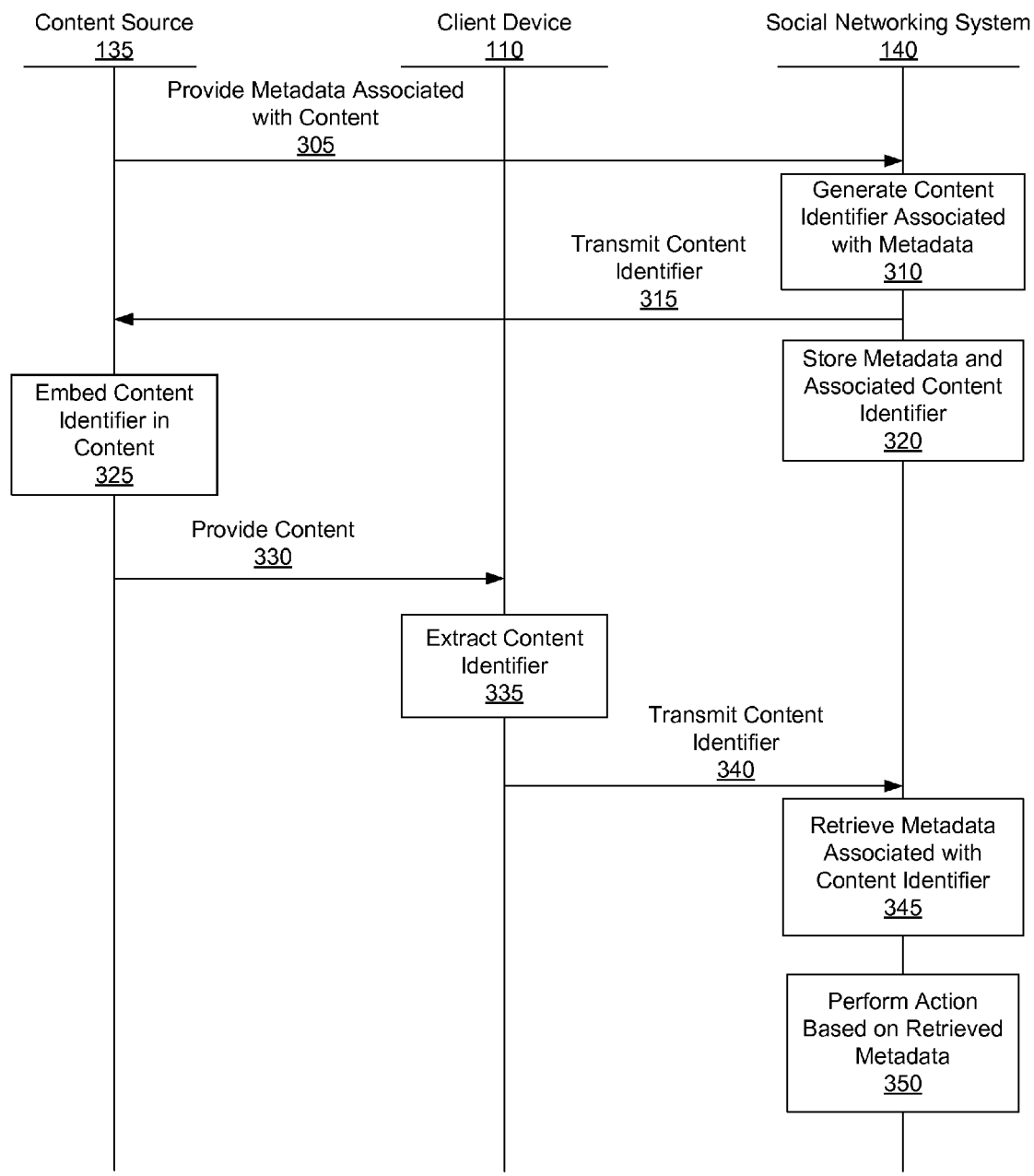
FIG. 3 is an interaction diagram of a method for performing an action based on a content identifier included in content received by a client device, in accordance with an embodiment of the invention.

FIG. 3 is an interaction diagram of one embodiment of a method for performing an action based on a content identifier included in content received by a client device 110. A content provider 135 provides 305 metadata associated with content, such as an audio signal or video data, to a social networking system 140 via a network 120. The metadata describes one or more characteristics of the content and may identify an action associated with the content. For example, the metadata identifies a source of the content, a location associated with the content, a title associated with the content, an artist associated with the content, or any other information describing the content. Additionally, the metadata may identify an action for the social networking system 140 to perform and one or more characteristics of the action. For example, the metadata may identify a check-in action and include a location associated with the check-in or may identify an action to distribute information describing content to social networking system users and specify the information to be distributed. Hence, the social networking system 140 may associate an action with the received metadata.

The social networking system 140 generates 310 a content identifier uniquely identifying the metadata and its associated content and transmits 315 the content identifier to the content source 135 via the network 120. Additionally, the social networking system 140 stores 320 the metadata, the content identifier and an association between the content identifier and the metadata. For example, the social networking system 140 maintains a table in the content store 210 including pairs of content identifiers and associated metadata. This allows the social networking system 130 to efficiently subsequently retrieve metadata associated with a content identifier.

In some embodiments, the content source provides 305 multiple items of metadata associated with content to the social networking system 140, and the social networking system generates 310 different content identifiers associated with each item of metadata. The different content identifiers are transmitted 315 to the content source via the network 120 and stored by the social networking system 140 in association with their respective item of metadata. This allows the content source to embed 325 multiple content identifiers in the content when it is provided 330 to a client device 110. For example, a content identifier embedded 325 in the content corresponds to an audio fingerprint identifying the content while a different content identifier embedded 325 in the content corresponds to metadata identifying the content source 135 or identifying a type of channel used to provide 330 the content to the client device 110. Including multiple content identifiers in content allows the content provider 130 to convey a variety of information describing the content or to identify a variety of actions to be performed when the content is identified by a user.

Upon receiving the content identifier from the social networking system 140, the content source 135 embeds 325 the content identifier into the content. When the content provider 135 subsequently provides 330 the content to a client device 110 associated with a user of the social networking system 140, the content identifier is provided 330 to the client device 110 along with the content. For example, if the content source 135 is generating an audio signal with an embedded content identifier, the client device 110 captures the audio signal via one or more microphones and an application executing on the client device 110 processes the audio signal and extracts 335 the content identifier. As another example, if the content source 135 is presenting video data, the client device 110 captures the video data through an image capture device and an application execution on the client device extracts 335 the content identifier from the video data.

The client device 110 transmits 340 the extracted content identifier to the social networking system 140 via the network 120, and the social networking system 140 retrieves 345 stored metadata associated with the content identifier. For example, the social networking system 140 identifies a pair of content identifier and metadata from the content store 210 using the extracted content identifier. Based on the retrieved metadata, the social networking system 140 performs 350 an action. Information describing the action or generated by the action may also communicated from the social networking system 140 to the client device 110 or to additional client devices 110.

Various actions may be performed 350 by the social networking system 140 based on the retrieved metadata, allowing a content provider 135 to influence user interaction by providing the social networking system 140 with metadata associated with content. For example, the social networking system 140 identifies an application from the metadata and executes the application when the content identifier is received. Information from the application may be presented via the client device 110 to a user. As another example, the social networking system 140 uses the metadata to select an advertisement and subsequently presents the selected advertisement via the client device 110. Additionally, the social networking system 140 may retrieve information describing the content (e.g., location, artist, title, synopsis, etc.) from the metadata and use the retrieved information to perform an action also identified by the metadata. For example, the social networking system 140 may notify other users connected to the user of the client device 110 of the user and information describing the content from the metadata. As another example, the social networking system 140 may present an interface to the user of the client device 110 including information retrieved from the metadata, allowing the user to augment the information with additional data. Additional examples of actions for the social networking system to perform 350 based on metadata associated with a received content identifier are described in U.S. Pat. No. 8,250,145, which is incorporated by reference herein in its entirety.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, at a social networking system, metadata associated with content from a content source;
    generating a content identifier associated with the metadata;
    associating an action with the content identifier;
    providing the content identifier to the content source;
    storing an association between the metadata and the content identifier at the social networking system;
    receiving the content identifier from a client device associated with a user of the social networking system;
    retrieving the metadata associated with the content identifier; and
    responsive to receiving the content identifier from the client device, performing the action associated with the content identifier in connection with the user.

2. The computer-implemented method of claim 1, further comprising:
    presenting a notification of the user and the action to one or more additional users of the social networking system connected to the user.

3. The computer-implemented method of claim 1, wherein performing the action based on the metadata associated with the content identifier comprises:
    retrieving information describing the content from the metadata associated with the content identifier; and
    notifying one or more users of the social networking system connected to the user of the information describing the content retrieved from the metadata associated with the content identifier and of the user.

4. The computer-implemented method of claim 1, wherein performing the action based on the metadata associated with the content identifier comprises:
    executing an application identified by the metadata associated with the content identifier; and
    providing information from the application to the client device associated with the user.

5. The computer-implemented method of claim 1, wherein performing the action based on the metadata associated with the content identifier comprises:
    retrieving a location from the metadata associated with the content identifier; and
    storing an association between the location the user associated with the client device from which the content identifier was received.

6. The computer-implemented method of claim 1, wherein performing the action based on the metadata associated with the content identifier comprises:
    identifying an advertisement based at least in part on the metadata associated with the content identifier; and
    presenting the identified advertisement to the user.

7. The computer-implemented method of claim 1, wherein the content from the content source comprises an audio signal.

8. The computer-implemented method of claim 1, wherein the content from the content source comprises video data.

9. The computer-implemented method of claim 1, wherein receiving, at the social networking system, metadata associated with content from the content source comprises:
    receiving a plurality of items of metadata associated with the content, each item of metadata describing one or more characteristics of the content.

10. The computer-implemented method of claim 9, wherein generating the content identifier associated with the metadata comprises:
    generating a plurality of content identifiers, each content identifier associated with an item of metadata.

11. The computer-implemented method of claim 10, wherein providing the content identifier to the content source comprises:
    providing the plurality of content identifiers to the content source.

12. The computer-implemented method of claim 11, wherein storing the association between the metadata and the content identifier at the social networking system comprises:
    storing associations between each item of metadata and its associated content identifier.

* * * * *